3,383,329
PREPARATION OF UNSATURATED NITRILES
BY A CATALYTIC PROCESS
Howard S. Young and Edgar L. McDaniel, Kingsport,
Tenn., assignors to Eastman Kodak Company, Rochester, N.Y., a corporation of New Jersey
No Drawing. Original application June 15, 1964, Ser. No. 375,303, now Patent No. 3,293,279, dated Dec. 20, 1966. Divided and this application Apr. 26, 1966, Ser. No. 574,835
13 Claims. (Cl. 252—432)

ABSTRACT OF THE DISCLOSURE

Novel catalyst composition comprising a heteropoly acid of molybdenum containing cerium as the central atom, an oxide of arsenic, a supporting carrier, and optionally at least one of an oxide of chromium, an oxide of manganese, an oxide of iron, and an oxide of boron. The catalyst is useful in the ammoxidative conversion of propylene to acrylonitrile.

---

This application is a division of our copending application Ser. No. 375,303, filed June 15, 1964, now U.S. Patent No. 3,293,279.

This invention relates to a process for preparing unsaturated aliphatic nitriles and to novel catalyst compositions useful in the process of the invention. More particularly it relates to a vapor phase process for the production of acrylonitrile by the reaction of propylene, ammonia and oxygen, in the presence of a catalyst comprising a mixture of an oxide of arsenic alone, or together with an oxide of chromium, manganese, iron or boron and a heteropoly acid of molybdenum containing cerium as the central atom on a carrier.

Unsaturated aliphatic nitriles have utility in a wide variety of commercial applications. Thus, acrylonitrile is known to be useful as an intermediate in organic syntheses of pharmaceuticals, dyes, etc., as well as being the basic component in many synthetic polymers that are useful for preparing fibers, films, molded articles and the like. It is known that unsaturated aliphatic nitriles can be prepared by reacting olefins with ammonia under oxidizing conditions at elevated temperatures. For example, J. N. Cosby in U.S. Patent No. 2,481,826, issued Sept. 13, 1949, describes the preparation of lower aliphatic nitriles such as acrylonitrile, methacrylonitrile and acetonitrile by reacting an olefin such as propene, butene-1, etc. with ammonia and oxygen, at 400–600° C., in the presence of various oxidation catalysts and expecially vanadium oxides containing molybdenum oxide. Where propene was used as the starting olefin, yields not exceeding about 6 mole percent (Example 6) of acrylonitrile and a substantial amount (10 mole percent) of hydrogen cyanide were obtained. In J. D. Idol, Jr., U.S. Patent No. 2,904,580, issued Sept. 15, 1959, a vapor phase method is also described for preparing acrylonitrile, wherein a mixture of propylene, ammonia and oxygen is passed over a catalyst consisting of the bismuth, tin, and antimony salts of phosphomolybdic and molybdic acids and bismuth phosphotungstate. This process is stated to require not only careful control of the surface area of the catalyst and pressure conditions, but the amount of water employed is a critical factor.

We have now found that by passing a mixture of a short-chain olefin, ammonia and oxygen, in certain proportions, at certain elevated temperatures and in vapor phase, over a catalyst comprising an essentially intimate mixture of (1) an oxide of arsenic alone or together with an oxide of chromium, manganese, iron or boron and (2) a heteropoly acid of molybdenum containing cerium as the central atom on a carrier the reaction goes smoothly to a relatively higher conversion to the principal product an unsaturated aliphatic nitrile, for example, where the olefin is propylene to acrylonitrile, and to a considerably lesser amount of acetonitrile, with a minimum of by-products as compared with prior art processes such as mentioned above, and that water is not critical to efficient operability of this process since excellent conversions and yields of acrylonitrile can be obtained without water as the diluent. The reaction products can be readily recovered from the effluent stream from the reactor by conventional means, e.g. by fractional distillation of the effluent condensate.

The catalyst compositions used in carrying out the process of the invention retain their activity and selectivity over relatively long-life periods without appreciable physical deterioration, thereby providing an efficacious vapor phase catalytic process for the production of unsaturated nitriles from certain olefins, ammonia and oxygen, and more especially acrylonitrile from propylene, ammonia and oxygen. The catalyst compositions are especially well adapted for continuous modes of operation as, for example, in a fluidized bed type of reactor.

It is, accordingly, an object of the invention to provide a novel vapor phase process for the preparation of unsaturated aliphatic nitriles, and in particular acrylonitrile from propylene, ammonia and oxygen, by use of a catalyst comprising an essentially intimate mixture of an oxide of arsenic alone or together with an oxide of chromium, manganese, iron or boron and a heteropoly acid of molybdenum containing cerium as the central atom on a carrier.

Another object is to carry out the conversion of propylene, ammonia and oxygen to acrylonitrile in a continuous manner.

Another object of the invention is to provide a novel catalyst composition for the preparation of unsaturated aliphatic nitriles, and in particular acrylonitrile from propylene, ammonia and oxygen, comprising an essentially intimate mixture of an oxide of arsenic alone or together with an oxide of chromium, manganese, iron or boron and a heteropoly acid of molybdenum containing cerium as the central atom on a carrier.

Other objects will become apparent from the general description and examples hereinafter.

In accordance with the invention, we prepare unsaturated aliphatic nitriles, and more especially acrylonitrile, by passing a feed mixture comprising a short-chain olefin containing from 3–4 carbon atoms such as, for example, propylene or isobutylene, ammonia and oxygen, in vapor phase at elevated temperatures, over a catalyst comprising an intimate mixture of (1) an oxide of arsenic alone or together with an oxide of chromium, manganese, iron or boron and (2) a heteropoly acid of molybdenum containing cerium as the central atom on a carrier. The reaction is illustrated with the preferred process, namely, the conversion of propylene, ammonia and oxygen to acrylonitrile as follows:

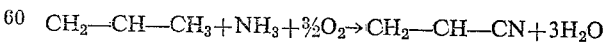

A minor proportion of acetonitrile is also formed.

The ratios of the reactants can be varied widely from the theoretical mole ratios of propylene:oxygen:ammonia of 1:1.5:1. Ratios near this, i.e. about 1: about 1.5: about 1 are preferable; however, the process is operable at propylene:oxygen ratios from 1:0.1 to 1:5, and propylene: ammonia ratios from 1:0.1 to 1:5. Both propylene:oxygen and propylene:ammonia ratios may be varied from the theoretical ratios.

Nitrogen may be fed to the reactor. This has no particular effect upon the chemistry involved; but has the practical advantage that since nitrogen is not detrimental, air may be used as the source of oxygen. In this case, the oxygen to nitrogen ratio is approximately 1:4. Water may be fed to the reactor or it may be omitted. It acts as a diluent and, when used, the preferred amounts in the form of water vapor range from 0.05–2.0 moles, or more, per mole of propylene in the feed. The temperature of the reaction can be varied from about 300° C. to about 600° C., but preferably ranges from about 400° C. to about 550° C. The reaction is not significantly pressure dependent. For example, it may be operated satisfactorily at atmospheric pressure, which condition is preferred, but lower or sub-atmospheric pressures and higher or super-atmospheric pressures may also be used to give generally similarly good results, e.g., from slightly below atmospheric to about 5 atmospheres. The choice of operating pressures may be governed by economic considerations such as are involved in plant design, product recovery, etc. The gaseous hourly space velocity (GHSV) may also be varied over a wide range, for example, values (STP) as low as 100 may be used, and values as high as 6000 may be used. The preferred space velocity is in the range of about 150 to about 1000. The catalyst may be used either in a fixed bed or in fluidized state. In the latter case, the catalyst exists as small particles which are suspended in an upflowing stream of reactant gases. The latter method of carrying out the invention offers advantages such as, for example, superior temperature control, and less explosive hazard. As previously indicated, water may be included, if desired, although this is not critical for the reaction goes well without such addition. When isobutylene is substituted for the propylene in the above described process, the principal product is methacrylonitrile.

In general, any type of apparatus that is suitable for carrying out the process of the invention in the vapor phase may be employed, e.g., a tubular type of reactor of furnaces which can be operated in continuous or intermittent manner and is equipped to contain the catalyst in intimate contact with the entering feed gases. The reacted gases are then conducted to suitable cooling and separatory equipment and the products further separated and recovered by any of the methods known to those skilled in the art. For example, one such method involves scrubbing the effluent gases from the reactor with cooled water or an appropriate solvent to remove the products of the reaction. In such case, the ultimate nitrile products may be separated by conventional means such as distillation of the resulting liquid mixtures. Unreacted ammonia and olefin may be recovered and recirculated through the system. Spent catalyst may also be reactivated by heating in contact with air.

The fluidized bed reactor employed by us in carrying out the process of the examples, consisted of an upright cylindrical tube of Vycor glass of 15 inches length. The lower portion of the tube has an internal diameter of 40 mm. and terminates in a conical bottom which is about 1 inch in length. The lower portion of the tube including the conical bottom is 25 cm. in length. The upper portion of the cylindrical reactor tube has an internal diameter of 55 mm. throughout the greater portion of its length and is tapered at its ends, i.e. where it forms the top end of the cylindrical reactor tube and where it joins the portion of the reactor tube which has an internal diameter of 40 mm. Feed gases were introduced through an inlet tube extending from the top of the reactor and passing through the center of the reactor into the bottom of the catalyst bed. This served to fluidize the catalyst bed and to preheat the feed gases. The reactor was heated electrically. The effluent gases and vapors were led from the reactor through a system of traps which were cooled with a Dry Ice bath. Acrylonitrile, water, acetonitrile, traces of hydrogen cyanide, and unreacted ammonia were collected in these traps. The condensate was washed from the thawed traps with water and this product was analyzed by gas chromatography for nitriles and by titration for ammonia.

The stripped gas stream was then led through a gas sampling valve to a wet test meter. Gas streams were analyzed with Orsat apparatus for unsaturates, carbon dioxide, etc. The stripped gas stream generally contained over 80 percent nitrogen and the rare gases. The unsaturates as determined by Orsat analysis were shown to be propylene by gas chromatography. The balance of the gas stream was propylene, oxygen, carbon dioxide, and carbon monoxide. The techniques described were found expedient and suitable for the practice of this invention. Other suitable techniques, such as are known to those skilled in the art, may be used without in any way limiting the scope of this invention.

In preparing the catalyst compositions employed by us in carrying out the process of the invention, an essentially intimate mixture of a heteropoly acid of molybdenum containing cerium as the central atom such as, for example, dodecamolybdoceric acid having the empirical formula $H_8CeMo_{12}O_{42}$, a carrier and an oxide of arsenic such as arsenic trioxide ($As_2O_3$) or arsenic pentoxide ($As_2O_5$) or mixtures thereof, and, if desired, an oxide of chromium, manganese, iron or boron or mixtures thereof, is prepared and calcined. The calcination can be carried out, for example, by heating the catalyst mixture at a temperature of from about 200° C. to about 600° C. for a period of several hours or more. The calcined mixture is then reduced to operable granules or particles. Preferably the calcining operation is carried out in the presence of air or other suitable oxygen-containing gaseous mixture. However, it can be conducted in the absence of oxygen. The catalyst compositions disclosed herein are believed to be novel.

The heteropoly acid or its ammonium salt can be used in the preparation of the catalyst. Presumably, the ammonium salt of the acid decomposes wholly, or in part, to ammonia and the acid under calcination or during use at reaction temperature. The concentration of the heteropoly acid of molybdenum containing cerium can vary from about 5% to about 60% (preferably 25 to 50%) by weight of the catalyst. The concentration of the oxide of arsenic, calculated as $As_2O_5$, can vary from about 1% to about 20% (preferably 2 to 13%) by weight of the catalyst. The concentration of the oxide of chromium, manganese or iron can vary from about 0.1% to about 25% (preferably 2 to 10%) by weight of the catalyst. The concentration of the oxide of boron can vary from about 0.1% to a maximum of about 5.0% (preferably 0.5 to 2%) calculated as boric oxide, by weight of the catalyst. The heteropoly acid is always present in a greater percent by weight than the oxide of arsenic, or the oxide of chromium, manganese or iron. The carrier can comprise about 30% to about 94% by weight of the catalyst composition. The most outstanding results in accordance with the invention are obtained with catalysts comprising 40 to 70% by weight of carrier. The heteropoly acid and the metallic oxides just named are supported on a carrier because it is advantageous to support them on a carrier. The percentages just given are for calcined carrier-supported catalysts. Thus the weight of the catalyst includes the weight of the carrier.

It may be that there is compound formation between the oxide of arsenic and the oxide of chromium, manganese, iron or boron. The chromium, manganese and iron components can be added directly as oxides or in the form of any other compounds, for example, salts such as the nitrates, sulfates, etc. which decompose to the oxides on heating. Compounds of boron such as borates, metaborates and pyroborates can also be used. Chromic oxide, manganic oxide, ferric oxide and boric oxide are the preferred oxides of chromium, manganese, iron or boron that can be employed in the novel catalyst compositions of the invention which are used in the process of the invention.

Carriers that can be employed, include, for example, silica, silica-alumina, kieselguhr, pumice, titania, zirconia, clay, etc. The use of silica as a carrier is preferred. The term silica includes silica gel, for example. The catalyst compositions can be readily regenerated by treatment with air or a gas containing molecular oxygen at or above the reaction temperature. While the arsenic-promoted molybdenum heteropoly acid catalysts of the invention are active and selective for the synthesis, the addition of the chromium, manganese or iron component improves the physical strength and activity of the catalyst. The boron component improves the activity of the catalyst. It is possible, that when an oxide of arsenic promoter is used in conjunction with chromium, manganese or iron, metal arsenates are formed. Physical strength is important in any solid catalyst, and especially in the case of those to be used in a fluidized state where the catalyst must be strong enough to resist attrition.

The definitions of certain terms used in the examples and Table 1 are defined as follows:

Contact time is the average time in seconds which the reactants spend at reaction conditions in a volume equal to that of the catalyst bed.

Gaseous hourly space velocity (GHSV) is defined as the number of volumes of feed gases (STP) which pass through one volume of catalyst bed in one hour.

The percent conversion to acrylonitrile may be based on propylene or on ammonia.

Based on propylene, percent conversion=

$$\frac{\text{moles acrylonitrile formed}}{\text{moles propylene fed}} \times 100$$

Based on ammonia, percent conversion=

$$\frac{\text{moles acrylonitrile formed}}{\text{moles ammonia fed}} \times 100$$

The yield may be calculated based on propylene or on ammonia.

Based on propylene, percent yield=

$$\frac{\text{moles acrylonitrile formed}}{\text{total moles propylene consumed}} \times 100$$

Based on ammonia, percent yield=

$$\frac{\text{moles acrylonitrile formed}}{\text{total moles ammonia consumed}} \times 100$$

Conversions and yields to acetonitrile are similarly defined with the moles of acetonitrile formed replacing moles of acrylonitrile in the appropriate expression.

This invention is further illustrated by the following Examples 1–14 of preferred embodiments thereof although it will be understood that these examples are included primarily for purpose of illustration and are not intended to limit the scope of the invention unless otherwise specifically indicated:

Example 1

A catalyst comprising by weight 5.0 percent arsenic pentoxide, 40.0 percent dodecamolybdoceric acid and 55.0 percent silica was prepared as follows. To 734 g. of ammonia-stabilized silica sol which was 30 percent silica was added with stirring 182.8 g. of ammonium dodecamolybdocerate octahydrate. The resulting slurry was stirred and heated, and to the hot slurry was added a solution of 20.0 g. of arsenic pentoxide in 150 ml. of water. The preparation was heated until it thickened and was then transferred to an evaporating dish. It was dried overnight at 130° C., and then calcined for four hours at 200° C.

Two hundred milliliters of 40×120 mesh of the catalyst just prepared were changed to a fluidized-solids reactor, and the test results shown in Table 1 were collected. This catalyst exhibited satisfactory conversions and yields of acrylonitrile.

Example 2

A catalyst comprising by weight 6.2 percent arsenic pentoxide, 40.1 percent dodecamolybdoceric acid and 53.7 percent silica was prepared as follows. To 734 g. of ammonia-stabilized silica sol which was 30% silica was added with stirring 188 g. of pulverized ammonium dodecamolybdocerate octahydrate crystals, followed by a solution of 25.9 g. of arsenic pentoxide in 100 ml. of water. The resulting slurry was stirred and heated until it gelled and then was dried on a steam bath and then in an oven at 130° C. The preparation was calcined for four hours in a muffle furnace at 200° C.

Two hundred milliliters of 40×120 mesh of the catalyst just prepared were charged to a fluidized-solids reactor, and the test results shown in Table 1 were collected. A good conversion to acrylonitrile was obtained.

Example 3

A catalyst comprising by weight 23.0 percent arsenic pentoxide, 37.0 percent dodecamolybdoceric acid and 40.0 percent silica was prepared as follows. To 533 g. of ammonia-stabilized silica sol which was 30% silica was added with stirring 169 g. of pulverized ammonium dodecamolybdocerate crystals, followed by a solution of 93.4 g. of arsenic pentoxide in 250 ml. of water. The resulting slurry was heated with stirring until it thickened, dried on a steam bath, and then calcined for 21 hours in a muffle furnace at 200° C.

One hundred and fifty milliliters of 40×120 mesh of the catalyst prepared in Example 3 were charged to a reactor and tested (see Table 1). Although some acrylonitrile was produced during the first cut (of thirty minutes length), during the second cut over this catalyst, at the same conditions, uncontrolled combustion occurred; and the run was terminated. These data indicate that high concentrations of the arsenic pentoxide component in catalyst compositions, i.e. outside the upper specified range (of 20%) of the invention, tend to be inoperable and are not preferred.

TABLE 1

| Ex. No. | Temp., °C. | Mole Ratios $C_3H_6:O_2:NH_3:H_2O:N_2$ | GHSV, STP | Percent | | | | | |
|---|---|---|---|---|---|---|---|---|---|
| | | | | Convn. to ACN, on $C_3H_6$ | Convn. to ACN, on $NH_3$ | Yield of ACN, on $C_3H_6$ | Yield of ACN, on $NH_3$ | Convn. to MeCN, on $C_3H_6$ | Yield of MeCN, on $C_3H_6$ |
| 1(a) | 475 | 1:1.5:1:1:6 | 630 | 19.1 | 19.1 | 85.2 | 19.1 | 4.3 | 19.4 |
| (b) | 475 | 1:1.5:1:1:6 | 630 | 17.2 | 17.2 | 60.8 | 17.2 | 3.4 | 12.1 |
| (c) | 515 | 1:1.5:1:1:6 | 630 | 24.0 | 24.0 | 64.4 | 24.0 | 3.9 | 10.4 |
| (d) | 445 | 1:1.5:1:1:6 | 630 | 5.6 | 5.6 | 32.4 | 5.6 | 1.8 | 10.4 |
| (e) | 555 | 1:1.5:1:1:6 | 630 | 22.7 | 22.7 | 34.0 | 22.7 | 10.4 | 15.6 |
| (f) | 555 | 1:1.5:1:1:6 | 630 | 20.8 | 20.8 | 33.7 | 20.8 | 11.5 | 18.6 |
| (g) | 575 | 1:1.5:1:1:6 | 630 | 19.6 | 19.6 | 36.2 | 19.6 | 10.2 | 18.8 |
| (h) | 600 | 1:1.5:1:1:6 | 630 | 14.5 | 14.5 | 32.4 | 14.5 | 5.6 | 12.6 |
| (i) | 560 | 1:1.5:1:1:6 | 840 | 12.7 | 12.7 | 23.8 | 12.7 | 6.0 | 11.2 |
| (j) | 550 | 1:1.5:2:1:6 | 630 | 18.4 | 9.1 | 36.7 | 9.1 | 13.0 | 25.9 |
| 2(a) | 485 | 1:1.5:1:1:6 | 630 | 25.2 | 25.2 | 57.5 | 25.2 | 6.1 | 14.0 |
| (b) | 480 | 1:1.5:1:1:6 | 630 | 21.5 | 21.5 | 46.4 | 21.5 | 4.0 | 8.7 |
| (c) | 475 | 1:1.5:1:1:6 | 840 | 14.6 | 14.6 | 49.1 | 19.8 | 4.7 | 15.9 |
| (d) | 470 | 1:1.5:1:1:6 | 450 | 23.5 | 23.5 | 41.9 | 23.5 | 5.5 | 9.9 |
| (e) | 450 | 1:1.5:1:1:6 | 540 | 12.2 | 12.2 | 45.7 | 12.2 | 5.9 | 22.0 |
| (f) | 520 | 1:1.5:1:1:6 | 720 | 24.9 | 24.9 | 38.1 | 24.9 | 5.3 | 8.2 |
| 3(a) | 500 | 1:1.5:1:1:6 | 630 | 12.0 | 12.0 | 27.9 | 12.0 | 0 | 0 |
| (b) | | 1:1.5:1:1:6 | 630 | Uncontrolled Combustion | | | | | |

ACN stands for acrylonitrile.

The feed streams in milliliters per minute, STP, and the contact times in seconds for Examples 1, 2 and 3 are set forth in Table 2 hereinafter.

TABLE 2

| Ex. No. | C₃H₆ | NH₃ | Air | Water Vapor | Contact Time |
|---|---|---|---|---|---|
| 1. (a) | 200 | 200 | 1,500 | 200 | 2.1 |
| (b) | 200 | 200 | 1,500 | 200 | 2.1 |
| (c) | 200 | 200 | 1,500 | 200 | 2.0 |
| (d) | 200 | 200 | 1,500 | 200 | 2.2 |
| (e) | 200 | 200 | 1,500 | 200 | 1.9 |
| (f) | 200 | 200 | 1,500 | 200 | 1.9 |
| (g) | 200 | 200 | 1,500 | 200 | 1.8 |
| (h) | 200 | 200 | 1,500 | 200 | 1.8 |
| (i) | 267 | 267 | 2,000 | 267 | 1.4 |
| (j) | 183 | 365 | 1,370 | 183 | 1.9 |
| 2.(a) | 200 | 200 | 1,500 | 200 | 2.1 |
| (b) | 200 | 200 | 1,500 | 200 | 2.1 |
| (c) | 267 | 267 | 2,000 | 267 | 1.6 |
| (d) | 143 | 143 | 1,072 | 143 | 2.9 |
| (e) | 172 | 172 | 1,290 | 172 | 2.2 |
| (f) | 229 | 229 | 1,715 | 229 | 1.7 |
| 3.(a) | 200 | 200 | 1,500 | 200 | 2.0 |
| (b) | 200 | 200 | 1,500 | 200 | 2.0 |

Example 4

A catalyst comprising by weight 8 percent chromic oxide, 12.1 percent arsenic pentoxide, 30 percent dodecamolybdoceric acid and 49.9 percent silica was prepared in the following manner. To 667 g. of ammonia-stabilized silica sol which was 30 percent silica was added with stirring 137 g. of pulverized ammonium dodecamolybdocerate octahydrate. The resulting slurry was stirred and heated, and to the hot slurry was added a solution containing 167 g. of chromic nitrate nonahydrate in 150 ml. water, followed by a solution containing 48.2 g. of arsenic pentoxide in 150 ml. of water. The slurry was heated and stirred until it thickened. It was then dried on a steam bath with occasional mixing. After overnight drying on the steam bath it was placed in a muffle furnace and calcined for 2½ hours at 200° C. and 1½ hours at 500° C. After cooling, the catalyst obtained was crushed and sieved and 200 ml. of 40×120 mesh material was charged to the laboratory reactor. This catalyst was quite hard after calcination.

A feed stream comprising 200 ml. of propylene, 200 ml. of ammonia, 1500 ml. of air, and 200 ml. of water vapor per minute, STP, was charged to the reactor. The reaction temperature was 480° C., and the contact time was 2.1 seconds. Over 30 minutes of operation, 5.21 g. of acrylonitrile and 1.04 g. of acetonitrile were recovered. This corresponded to a conversion to acrylonitrile of 37.0 percent (based on propylene or on ammonia), with a yield of 55.6 percent based on propylene and 37.0 percent based on ammonia. The conversion to acetonitrile was 9.6 percent.

Example 5

To the laboratory reactor was charged 150 ml. of 40×120 mesh catalyst prepared as described in Example 4. It was tested at the reaction conditions of Example 4, except that with the smaller catalyst volume and the same feed rate, the contact time was decreased to 1.6 seconds. Over 30 minutes of operation, 5.53 g. of acrylonitrile and 0.44 g. of acetonitrile were recovered. This corresponded to a conversion to acrylonitrile of 38.9 percent (based on propylene or ammonia), with a yield of 68.6 percent based on propylene and 38.9 percent based on ammonia. The conversion to acetonitrile was 4.0 percent.

Example 6

A catalyst comprising by weight 4.0 percent chromic oxide, 6.1 percent arsenic pentoxide, 30 percent dodecamolybdoceric acid and 59.9 percent silica was prepared as follows. To 800 g. of stirred, ammonia-stabilized silica sol which was 30 percent silica were added 137 g. of pulverized ammonium dodecamolybdocerate octahydrate crystals. The resulting slurry was heated, and to the hot slurry was added a solution of 84 g. of chromium nitrate nonahydrate in 75 ml. of water, followed by a solution of 24.2 g. of arsenic pentoxide in 75 ml. of water. The slurry was evaporated to dryness on a steam bath, dried in an oven at 130° C. and calcined for ninety minutes in a muffle furnace at 500° C. The catalyst obtained was pulverized and 150 ml. of 40×120 mesh material was charged to the reactor. On pulverization, this catalyst was quite hard, and its physical strength was very good.

A feed stream comprising 200 ml. of propylene, 200 ml. of ammonia, 1500 ml. of air and 200 ml. of water vapor per minute, STP, was fed to the reactor. The reaction temperature was 485° C. and the contact time was 1.6 seconds. Over 30 minutes of operation, 5.03 g. of acrylonitrile and 0.39 g. of acetonitrile were recovered. This corresponded to a conversion to acrylonitrile of 35.4 percent, based on propylene or on ammonia, and a yield of 70.8 percent based on propylene and 35.4 percent based on ammonia. The conversion to acetonitrile was 3.5 percent.

Example 7

To the catalyst of Example 6 was fed a stream of gases comprising 267 ml. propylene, 267 ml. ammonia, 2000 ml. air, and 267 ml. water vapor per minute, STP. The reaction temperature was 510° C., with a 1.1 second contact time. Over 30 minutes of operation, 4.02 g. of acrylonitrile and 0.38 g. of acetonitrile were recovered. This corresponded to a conversion to acrylonitrile of 24.6 percent, based on propylene or on ammonia. The yield of acrylonitrile was 43.0 percent, based on propylene, and 26.2 percent, based on ammonia. The conversion to acetonitrile was 3.0 percent.

Example 8

To the catalyst of Example 6 was fed a stream of gases comprising 143 ml. propylene, 143 ml. ammonia, 1071 ml. air, and 143 ml. water vapor per minute, STP. The reaction temperature was 445° C., and the contact time was 2.3 seconds. Over 30 minutes of operation, 1.94 g. of acrylonitrile and 0.14 g. of acetonitrile were recovered. This corresponds to an acrylonitrile conversion of 19.1 percent, based on propylene or on ammonia. The yield of acrylonitrile was 33.3 percent, based on propylene, and 20.8 percent, based on ammonia. The conversion to acetonitrile was 1.8 percent.

Example 9

A catalyst comprising by weight 8.2 percent manganic oxide, 11.9 percent arsenic pentoxide, 30 percent dodecamolybdoceric acid, and 49.9 percent silica was prepared as follows. To 667 g. of stirred, ammonia-stabilized silica sol which was 30 percent silica were added 137 g. of ammonium dodecamolybdocerate octahydrate. The resulting slurry was heated and to it was added a solution of 73.8 g. of manganous nitrate in 70 ml. of water, resulting in immediate gelation. The gel was dispersed by adding 100 ml. of water with stirring, and then a solution of 48.1 g. of arsenic pentoxide in 150 ml. of water was added. The resulting preparation was evaporated to dryness on a steam bath and then calcined in a muffle furnace for 2¾ hours at 200° C. and then for 1½ hours at 500° C. This catalyst thus obtained was quite hard, with excellent physical strength.

To the reactor was charged 150 ml. of 40×120 mesh of the catalyst obtained as just described. A feed stream comprising 200 ml. propylene, 200 ml. ammonia, 1500 ml. air, and 200 ml. water vapor per minute, STP, was then charged to the reactor. The reaction temperature was 472° C., and the contact time was 1.6 seconds. Over 30 minutes of operation, 2.16 g. of acrylonitrile and 0.36 g. of acetonitrile were recovered. This corresponds to a conversion to acrylonitrile of 15.2 percent, based on propylene or on ammonia, with a yield of 42.6 percent based on propylene and 22.7 percent based on ammonia. The conversion to acetonitrile was 3.3 percent.

Example 10

The catalyst of Example 9 was used at the same conditions as in that example, with the single modification that the water vapor in the feed stream was replaced with nitrogen. Thus no water was fed in this cut. Over 30 minutes of operation, 2.40 g. of acrylonitrile and 0.16 g. of acetonitrile were recovered. This corresponds to a conversion to acrylonitrile of 16.8 percent. The yield of acrylonitrile was 45.2 percent, based on propylene, and 22.5 percent, based on ammonia. The conversion to acetonitrile was 1.5 percent.

Example 11

To the catalyst of Example 9 was fed a stream of 267 ml. of propylene, 267 ml. of ammonia, 2000 ml. of air, and 267 ml. of water vapor, STP, per minute. The reaction temperature was 498° C., with a 1.1 second contact time. Over 30 minutes of operation, 3.36 g. of acrylonitrile and 0.34 g. of acetonitrile were produced. The conversion to acrylonitrile was 17.8 percent, based on propylene or on ammonia. The yield of acrylonitrile was 39.0 percent, based on propylene, and 20.7 percent, based on ammonia. The conversion to acetonitrile was 2.3 percent.

Example 12

A catalyst comprising by weight 8.2% ferric oxide, 11.8% arsenic pentoxide, 30% dodecamolybdoceric acid and 50% silica was prepared. To 667 g. of ammonia-stabilized silica sol, which was 30% silica, were added 137 g. of pulverized ammonium dodecamolybdocerate octahydrate. The resulting slurry was stirred and heated, and to the hot slurry was added a solution of 47.2 g. of arsenic pentoxide in 200 ml. of water, followed by a solution of 166 g. ferric nitrate nonahydrate in 200 ml. of water. After continued heating and stirring the slurry thickened, and it was dried at 130° C. The preparation was then calcined at 500° C. The catalyst was crushed, sieved, and 150 ml. of 40×120 mesh material was charged to a laboratory fluidized-solids reactor.

A feed stream comprising 200 ml. of propylene, 200 ml. of ammonia, 1500 ml. of air, and 200 ml. of water vapor per minute, STP, was then charged to the reactor. The reaction temperature was 480° C. with a contact time of 1.6 seconds. Over 30 minutes of operation, 3.8 g. of acrylonitrile were collected. No acetonitrile or acrolein was detected. This corresponds to a conversion to acrylonitrile of 26.7%, with a yield of 48.7%, based on propylene.

Example 13

Example 12 was repeated with the modification that the water vapor was replaced with an equivalent volume of nitrogen, so that the other reaction conditions were the same. Over 30 minutes of operation, 3.34 g. of acrylonitrile were collected. No acetonitrile or acrolein was detected. This corresponds to a conversion to acrylonitrile of 23.6%, with a yield of 39.0%, based on propylene.

Example 14

To the catalyst of Example 12 was charged a stream of 143 ml. of propylene, 143 ml. of ammonia, 1072 ml. of air, and 143 ml. of water vapor per minute, STP. The reaction temperature was 460° C., and the contact time was 2.3 seconds. Over 30 minutes of operation, 2.4 g. of acrylonitrile and 0.2 g. of acetonitrile were collected. This corresponds to a conversion to acrylonitrile of 24.1%, with a yield of 37.7% based on propylene. The conversion to acetonitrile was 4.8%.

The calcining operations described hereinbefore were carried out in the presence of air.

Other catalyst compositions coming within the specified ranges of components of the invention can also be prepared in accordance with the procedures described hereinbefore. Thus calcined catalytic compositions containing by weight (a) 10% dodecamolybdoceric acid, 2% arsenic pentoxide, 2% chromic oxide and 86% silica; (b) 25% dodecamolybdoceric acid, 8% arsenic pentoxide, 6% chromic oxide and 61% silica; (c) 35% dodecamolybdoceric acid, 13% arsenic pentoxide, 10% chromic oxide and 42% silica; (d) 45% dodecamolybdoceric acid, 6% arsenic pentoxide, 15% chromic oxide and 34% silica; (e) 50% dodecamolybdoceric acid, 4% arsenic pentoxide and 46% silica; (f) 60% dodecamolybdoceric acid, 5% arsenic pentoxide and 35% silica; (g) 40% dodecamolybdoceric acid, 5% arsenic pentoxide, 2% manganic oxide and 53% silica; (h) 45% dodecamolybdoceric acid, 5% arsenic pentoxide, 10% manganic oxide and 40% silica; (i) 40% dodecamolybdoceric acid, 5% arsenic pentoxide, 2% ferric oxide and 53% silica; (j) 35% dodecamolybdoceric acid, 4% arsenic pentoxide, 10% ferric oxide and 51% silica; (k) 40% dodecamolybdoceric acid, 5% arsenic pentoxide and 55% silica; (l) 30% dodecamolybdoceric acid, 6% arsenic pentoxide and 64% silica; (m) 30% dodecamolybdoceric acid, 2% arsenic pentoxide, 2% boric acid and 66% silica; (n) 40% dodecamolybdoceric acid, 5% arsenic pentoxide, 0.5% boric acid and 54.5% silica; (o) 50% dodecamolybdoceric acid, 9% arsenic pentoxide, 1% boric acid and 40% silica and (p) 25% dodecamolybdoceric acid, 5% arsenic pentoxide, 2% boric acid and 68% silica, for example, can be prepared and used in the process of our invention. These catalysts likewise give relatively high conversions of propylene, ammonia, and oxygen to acrylonitrile with a minimum production of acetonitrile and other by-products when employed in accordance with the process of the invention. Also, as previously indicated, isobutylene may be substituted for the propylene in the examples to obtain methacrylonitrile.

As indicated hereinbefore spent catalyst can be reactivated by heating in contact with air. Spent catalyst can be regenerated, for example, by fluidizing with air at a temperature of about 430° C. to about 450° C. for 30 minutes. The catalysts employed herein were regenerated in the manner just set forth. Thus, the catalysts used in Examples 1, 2 and 3, for example, were regenerated after a run by fluidizing with air at a temperature of about 430° C. to about 450° C. for 30 minutes.

The process of the invention has been illustrated in the preceding examples with certain specific catalyst compositions and certain ratios of olefin to oxygen. However, as indicated hereinbefore, generally similar results are obtained by using other catalyst compositions of our invention and by using ratios of reactants coming within the specified ranges under the conditions specified hereinbefore.

This invention has been described in detail with particular reference to preferred embodiments thereof, but it will be understood that variations and modifications can be effected within the spirit and scope of the invention as described hereinbefore and as defined in the appended claims.

What we claim is:

1. Catalyst composition comprising a calcined mixture of (1) about 5% to about 60% by weight of a molybdoceric heteropoly acid, (2) about 1% to about 20% by weight of an oxide of arsenic, calculated as $As_2O_5$, and (3) about 30% to about 94% by weight carrier, wherein (1) and (2) are supported on said carrier.

2. Catalyst composition as defined in claim 1 wherein said calcined mixture includes a compound selected from the group consisting of an oxide of chromium, an oxide of manganese, a oxide of iron, an oxide of boron and mixtures thereof, said oxide of chromium, said oxide of manganese and said oxide of iron being present in about 0.1% to about 25% by weight of said oxide of boron being present in about 0.1% to about 5.0% by weight.

3. Catalyst composition as defined in claim 1 wherein said molybdoceric heteropoly acid is present in about 25% to about 50% by weight, said oxide of arsenic is present in about 2% to about 13% by weight, and said carrier is present in about 40% to about 70% by weight.

4. Catalyst composition as defined in claim 2 wherein said oxide of chromium, said oxide of manganese, and said oxide of iron are present in about 2% to about 10% by weight, and said oxide of boron is present in about 0.5% to about 2% by weight.

5. Catalyst composition as defined in claim 1 wherein said calcined mixture comprises (1) about 5% to about 60% by weight of a molydoceric heteropoly acid, (2) about 1% to about 20% by weight of an oxide of arsenic, calculated as $As_2O_5$, (3) about 30% to about 93.9% by weight carrier, and (4) about 0.1% to about 25% by weight of chromic oxide, wherein (1), (2) and (4) are supported on said carrier.

6. Catalyst composition as defined in claim 4 wherein said calcined mixture comprises (1) about 25% to about 50% by weight of a molybdoceric heteropoly acid, (2) about 2% to about 13% by weight of an oxide of arsenic, calculated as $As_2O_5$, (3) about 40% to about 70% by weight of a carrier, and (4) about 2% to about 10% by weight of an oxide of chromium.

7. Catalyst composition as defined in claim 6 wherein said carrier is silica.

8. Catalyst composition as defined in claim 7 wherein said oxide of arsenic is arsenic pentoxide.

9. Catalyst composition as defined in claim 7 wherein said oxide of arsenic is arsenic trioxide.

10. Catalyst composition as defined in claim 9 wherein said molybdoceric heteropoly acid is dodecamolybdoceric acid.

11. Process of preparing a catalyst composition comprising the steps of:
   (1) Adding a member selected from the group consisting of a molybdoceric heteropoly acid and the ammonium salt of a molybdoceric heteropoly acid to a silica sol to form a mixture;
   (2) Adding an aqueous solution of an oxide of arsenic to the mixture obtained in (1);
   (3) Drying the mixture obtained in (2); and
   (4) Calcining the dried mixture.

12. Process for preparing a catalyst composition as defined in claim 11 wherein an aqueous solution of a compound which is an oxide or a compound which decomposes to an oxide under the conditions of the process, said compound being selected from the group consisting of a compound of chromium, a compound of manganese, a compound of iron, a compound of boron, and mixtures thereof is added to the mixture obtained in (2).

13. Process for preparing a catalyst composition as defined in claim 12 wherein the molybdoceric heteropoly acid is dodecamolybdoceric acid and the step of calcining the dried mixture is carried out at a temperature of from about 200° C. to about 600° C.

References Cited

UNITED STATES PATENTS

| | | | |
|---|---|---|---|
| 3,135,783 | 6/1964 | Sennewald et al. | 260—465.3 |
| 3,226,421 | 12/1965 | Giordano et al. | 260—465.3 |
| 3,232,978 | 2/1966 | Yasuhara et al. | 252—456 XR |
| 3,254,110 | 5/1966 | Sennewald et al. | 252—456 XR |
| 3,262,962 | 7/1966 | McDaniel et al | 252—462 XR |
| 3,324,166 | 6/1967 | Sennewald et al. | 252—455 XR |

PATRICK P. GARVIN, *Primary Examiner.*

DANIEL E. WYMAN, *Examiner.*